United States Patent [19]
Schmaling et al.

[11] Patent Number: 5,431,538
[45] Date of Patent: Jul. 11, 1995

[54] HYBRID COMPOSITE FLEXBEAM FOR A HELICOPTER BEARINGLESS MAIN ROTOR ASSEMBLY

[75] Inventors: David N. Schmaling, Oxford, Conn.; Francis E. Byrnes, White Plains, N.Y.

[73] Assignee: United Technologies Corporation, Hartford, Conn.

[21] Appl. No.: 87,826

[22] Filed: Jul. 1, 1993

[51] Int. Cl.⁶ .............................................. B64C 27/33
[52] U.S. Cl. .................................. 416/134 A; 416/230
[58] Field of Search ................... 416/134 A, 138, 141, 416/230

[56] References Cited

U.S. PATENT DOCUMENTS

| | | | |
|---|---|---|---|
| 4,037,988 | 7/1977 | Laird | 416/134 A |
| 4,332,525 | 6/1982 | Cheney, Jr. | 416/134 A |
| 4,369,018 | 1/1983 | Brunsch et al. | 416/134 A |
| 4,427,340 | 1/1984 | Metzger et al. | 416/134 A |
| 4,648,800 | 3/1987 | Fradenburgh et al. | 416/134 A |
| 4,714,409 | 12/1987 | Denison et al. | 416/230 A |
| 4,746,272 | 5/1988 | Noehren et al. | 416/134 A |
| 4,822,245 | 4/1989 | Aubry et al. | 416/134 A |
| 4,892,461 | 1/1990 | Matsumoto et al. | 416/134 A |
| 4,898,515 | 2/1990 | Beno et al. | 416/134 A |
| 5,091,029 | 2/1992 | Davis et al. | 416/134 A |
| 5,096,380 | 3/1992 | Byrnes et al. | 416/134 A |
| 5,242,267 | 9/1993 | Byrnes et al. | 416/134 A |
| 5,263,821 | 11/1993 | Noehren et al. | 416/134 A |

Primary Examiner—Edward K. Look
Assistant Examiner—Michael S. Lee
Attorney, Agent, or Firm—Terrance J. Radke

[57] ABSTRACT

A hybrid composite flexbeam for a soft inplane bearingless main rotor assembly has eight spanwise regions: a hub attachment region; a first tapered region; a second tapered region; an inboard transition region; a pitch region having a cruciform configuration; an outboard transition region; a tapered outboard transition region; and a main rotor blade, torque tube attachment region. The pitch region is formed from unidirectional fiberglass plies, a 50/50 admixture of unidirectional fiberglass and graphite plies, and unidirectional graphite plies, all of which extend from root to tip of the hybrid flexbeam. Unidirectional fiberglass and graphite plies of varying lengths are interleaved in the second inboard tapered region. Fiberglass and graphite cross plies of varying lengths are interleaved in the first inboard tapered region. Fiberglass and graphite cross plies and unidirectional fiberglass plies of varying length are interleaved in the outboard tapered region. The ends of the plies of varying length form distributed ply drop-off arrangements in the first and second inboard tapered regions and the outboard tapered region. The distributed arrangement of ply endings cause kick loads in the hybrid flexbeam to be distributed across the ply build-ups. Fiberglass edge caps having a U-shaped configuration may be disposed in combination with the leading and trailing edges of the hybrid flexbeam, starting at the limits of the pitch region and extending inboardly and outboardly therefrom, respectively.

24 Claims, 6 Drawing Sheets

HYBRID COMPOSITE FLEXBEAM FOR A HELICOPTER BEARINGLESS MAIN ROTOR ASSEMBLY

The Government has rights in the invention pursuant to a contract awarded by the Department of the Army.

RELATED APPLICATION

The present application is related to commonly-owned, co-pending U.S. patent application Ser. No. 08/070,573, filed 2 June 1993, entitled A FLEXBEAM FOR A HELICOPTER BEARINGLESS MAIN ROTOR ASSEMBLY.

TECHNICAL FIELD

The present invention relates to bearingless main rotor assemblies for helicopters, and more particularly, to a hybrid composite flexbeam for a helicopter bearingless main rotor assembly.

BACKGROUND OF THE INVENTION

Helicopter main rotor assemblies are subjected to a variety of operational forces—aerodynamic, inertial, and centrifugal. The hub of a helicopter main rotor assembly must have sufficient mechanical strength to react such forces, and yet be compliant enough to allow each main rotor blade some independent motion to relieve the stresses therein. To accommodate these conflicting conditions, prior art main rotor assemblies have been fabricated from high strength metallic materials and incorporated hinges and/or bearings to facilitate independent motion of each main rotor blade. Such prior art main rotor assemblies have been mechanically complex, difficult to maintain, and costly to operate.

While some improvements in service requirements, reliability, and cost have been achieved by the use of elastomeric bearings in helicopter main rotor assemblies, the focus recently has been on "bearingless" main rotor (BMR) assemblies. BMR assemblies incorporate flexible structural members, e.g., flexbeams, that are designed to transmit and/or react bending loads (flapwise and chordwise), axial loads (centrifugal), and torsional loads (pitch). Each flexbeam is attached directly to the hub of the BMR assembly to provide a "hingeless" configuration that eliminates the need for rolling-element or elastomeric bearings (flap, drag, pitch) at the hub attachment point. In designing a flexbeam for a BMR assembly, several conflicting design constraints must be accommodated.

First, the attachment joints of the flexbeam must be structurally rigid to transmit blade loads to the BMR hub assembly. The flexbeam must include a flap hinge portion to provide a bending capability to react flapwise loading. Concomitantly, the flap hinge portion of the flexbeam must be structurally configured to accommodate the high bending strains resulting from high maneuver rotor loading and to react blade centrifugal loads. Third, the flexbeam must include a pitch section with reduced torsional stiffness to facilitate collective and cyclic pitch control, i.e., high elastic torsional displacements, of the main rotor blade. Concomitantly, the pitch section must accommodate the high torsional strains resulting from cyclic/collective pitch inputs and must provide sufficient strength to react blade centrifugal loads and to prevent torsional buckling of the flexbeam under chordwise loading.

A primary benefit of the flexbeam is the segregation of flapwise loads from torsional loads, thereby permitting increased flapwise displacement while reducing hub moment offset. The flight characteristics and capabilities of a helicopter are determined in substantial part by the design of the main rotor assembly, and, more specifically, by the distance between the main rotor hub assembly and the equivalent flap hinge, i.e., hub moment constant or hinge offset (expressed as a percentage of rotor radius). As hinge offset increases (the further the "hinge" is from the hub center, the larger the hub moment constant), blade loads are more effectively transmitted to the helicopter via the main rotor hub assembly, i.e., control power and agility increase with greater hinge offset. Vibration and gust sensitivity also increase with hinge offset, however, and helicopter pitch stability is likewise progressively degraded with increasing hinge offset. Hinge offset is, therefore, a compromise between agility and high-speed handling. It is difficult to design a hub assembly for a BMR assembly that is flexible enough to provide a low hinge offset, yet strong enough to carry the high centrifugal loads (as much as thirty-five tons).

The design of composite flexbeams for BMR assemblies is one of the most challenging problems confronting helicopter design engineers. The composite flexbeam must be designed to meet bending strain, shear stress, buckling, and frequency limitations for critical loading conditions, i.e., flapwise, chordwise, torsional, and centrifugal loads, that result from design constraints such as hub moment stiffness, vibratory chord moment, and pitch angle. The critical loading conditions include start up and shutdown, which generate low-cycle, high-strain flapwise and chordwise loads, and forward flight conditions, which can generate high-cycle, high-strain loads such as 1 cycle/rev oscillatory flap and torsional displacements.

In general, a certain minimum cross section is necessary to transmit the main rotor blade centrifugal loads. Conversely, however, the thickness of the given composite material(s) comprising the flexbeam must be minimized to ensure that maximum allowable torsion shear strain limits are not exceeded. Flapwise and chordwise loads require additional material in the flexbeam to accommodate bending stresses. Such additional material, however, increases flexbeam stiffness, causing increased hinge offset. For a soft inplane rotor design, the chordwise flexbeam stiffness is governed by the need to place the rotor chordwise frequency at about 0.7 cycle/rev. If the flexbeam is too compliant in chordwise flexibility, the BMR assembly is more susceptible to aeromechanical and structural instability. If the flexbeam is too stiff, however, chordwise loads will increase because of 1 cycle/rev resonance. The torsional stiffness of the pitch section of the flexbeam should be minimized to keep pitch actuator power requirements to a minimum. In contradistinction, however, the torsional stiffness of the pitch section should be high to provide buckling stability under edgewise loading.

While helicopter design engineers struggle to accommodate the foregoing design constraints in designing an optimal flexbeam for a BMR assembly, attention must also be paid to manufacturing considerations. The flexbeam design should be relatively uncomplicated from a manufacturing standpoint. The composite flexbeam must be designed to avoid unsuitable cross-sectional transitionings and abrupt cross-sectional changes. It is known in the art to design flexbeams with upper and/or lower ribs to provide the necessary design strength. However, the manufacture of a composite flexbeam incorporating ribbed structure(s) is a relatively complex fabrication procedure. Prior art flexbeams having pitch sections of rectangular configuration that accommodated centrifugal loads and precluded torsional bucking were generally too stiff torsionally to accommodate the required torsional pitch deflections.

A need exists to provide an optimized flexbeam for a soft inplane BMR assembly. The flexbeam should be design optimized to accommodate the bending strain, shear stress, buckling, and frequency requirements of the BMR assembly while concomitantly being simple to manufacture. The flexbeam should incorporate a cross section that minimizes manufacturing risk while maximizing torsional efficiency.

SUMMARY OF THE INVENTION

One object of the present invention is to provide a hybrid composite flexbeam for a simple, low-cost, soft inplane bearingless main rotor (BMR) assembly for a helicopter.

Another object of the present invention is to provide a hybrid composite flexbeam that is structurally configured to accommodate the bending strain, shear stress, buckling, and frequency requirements of the soft inplane BMR assembly.

Still another object of the present invention is to provide a hybrid composite flexbeam having a cross section to minimize manufacturing risk and to maximize torsional efficiency.

Yet another object of the present invention is to provide a hybrid composite flexbeam that has excellent ballistic tolerance characteristics.

Still a further object of the present invention is to provide a hybrid composite flexbeam structurally configured to provide a pitch deflection capability in the flexural portion thereof such that the twist rate of the flexbeam is minimized.

Yet a further object of the present invention is to provide a composite hybrid flexbeam formed from composite plies having ply endings that form distributed ply drop-off arrangements in selected regions of the hybrid flexbeam such that the kick loads of the flexbeam are distributed into the ply build-up relatively uniformly rather than concentrated at a localized line of action.

These and other objects of the present invention are achieved by a hybrid composite flexbeam according to the present invention for a soft inplane BMR assembly. The flexbeam comprises eight spanwise regions: a hub attachment region; a first inboard tapered region; a second inboard tapered region; an inboard transition region; a pitch region having a cruciform configuration; an outboard transition region; an outboard tapered region; and a main rotor blade, torque tube (BT) attachment region. Each region is structurally configured to perform a specific primary function and is coupled to adjacent regions and their functions. In particular, the first and second tapered regions define a tapered flexural region that is structurally configured to provide a pitch deflection capability, in addition to accommodating flapwise loading, such that the pitch region of the hybrid flexbeam has a relatively low twist rate.

The hybrid composite flexbeam is comprised of an admixture of composite plies embodying specific characteristics. More specifically, the flexbeam is fabricated from composite plies having good ballistic tolerance characteristics and from composite plies having a high stiffness-to-weight ratio. The hybrid flexbeam according to the present invention comprises unidirectional fiberglass and graphite plies having fiber orientations of 0°, and fiberglass and graphite cross plies of varying lengths having fiber orientations of ±45°.

The pitch region of the hybrid composite flexbeam is formed from continuous (root to tip) unidirectional fiberglass plies, a 50/50 admixture of continuous unidirectional fiberglass and graphite plies, and continuous unidirectional graphite plies. The continuous unidirectional graphite plies define the cruciform configuration of the pitch region. The ply configuration of the pitch region provides low torsional stiffness, a low chordwise stiffness, a high flatwise stiffness, and low strains. Unidirectional fiberglass plies are added in the inboard and outboard transition regions to transition the hybrid flexbeam from the cruciform configuration of the pitch region to a rectangular cross-sectional configuration.

Full width unidirectional fiberglass and graphite plies of varying lengths are internally interleaved in combination with the fiberglass and graphite plies extending inboardly from the inboard transition region in the second inboard tapered region. The internally interleaved unidirectional plies comprise side strips of fiberglass and alternating center strips of fiberglass and graphite. In addition, unidirectional fiberglass plies are superposed on the external surfaces of the second inboard tapered region.

The ply configuration of the second inboard tapered region has a relatively low torsional stiffness to accommodate a portion of the elastic torsional displacements of the hybrid flexbeam such that the peak twist rate in the pitch region is reduced. The second inboard tapered region provides increasing flatwise and chordwise stiffness to control placement of the effective hinge offset and the first chord frequency of the hybrid flexbeam.

Full width fiberglass and graphite cross plies of varying lengths are interleaved in combination with the unidirectional fiberglass and graphite plies extending inboardly from the second inboard tapered region in the first inboard tapered region. The fiberglass cross plies mitigate the thermal incompatibility between the unidirectional fiberglass plies and the graphite cross plies. The fiberglass and graphite cross plies provide both torsional stiffness and flexural capability in the hybrid flexbeam, and provide transitioning into the ply configuration required in the hub attachment region. The ply configuration of the hub attachment region is a substantially 50/50 admixture of unidirectional plies and cross plies of fiberglass and graphite. Such a ply configuration provides high torsional stiffness and good flexural strength and facilitates the bolted connection of the hub attachment region in combination with the BMR assembly.

Full width fiberglass and graphite cross plies and unidirectional fiberglass plies of varying lengths are interleaved in combination with the outboardly extending unidirectional fiberglass and graphite plies of the outboard transition region in the outboard tapered region. The fiberglass and graphite cross plies provide both torsional stiffness and flexural capability in the hybrid flexbeam, and the cross plies, in combination with the unidirectional fiberglass plies, provide transitioning into the ply configuration required in the BT attachment region. The ply configuration of the BT attachment region is a substantially 50/50 admixture of unidirectional plies and cross plies of fiberglass and graphite. Such a ply configuration provides high torsional stiffness and good flexural strength and facilitates the bolted connection of the respective torque tube and main rotor blade in combination with the BT attachment region.

The ends of the interleaved unidirectional and cross plies of fiberglass and graphite define distributed ply drop-off arrangements in the first and second inboard tapered regions and the outboard tapered region. The respective distributed arrangements of ply endings of the hybrid composite flexbeam according to the present invention results in non-additive kick loads in the ply buildups comprising the hybrid flexbeam. In consequence, there is no strength reduction in the hybrid flexbeam due to the ply endings of the interleaved plies.

In an alternative embodiment, fiberglass end caps having a U-shaped configuration are disposed in combination with the leading and trailing edges of selected portions of the hybrid composite flexbeam, starting at the limits of the pitch region and extending inboardly and outboardly therefrom, respectively. The edge caps prevent the splinter-type fracture mode generally associated with width transitions in composite structures.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF PREFERRED EMBODIMENTS

Figure 1:
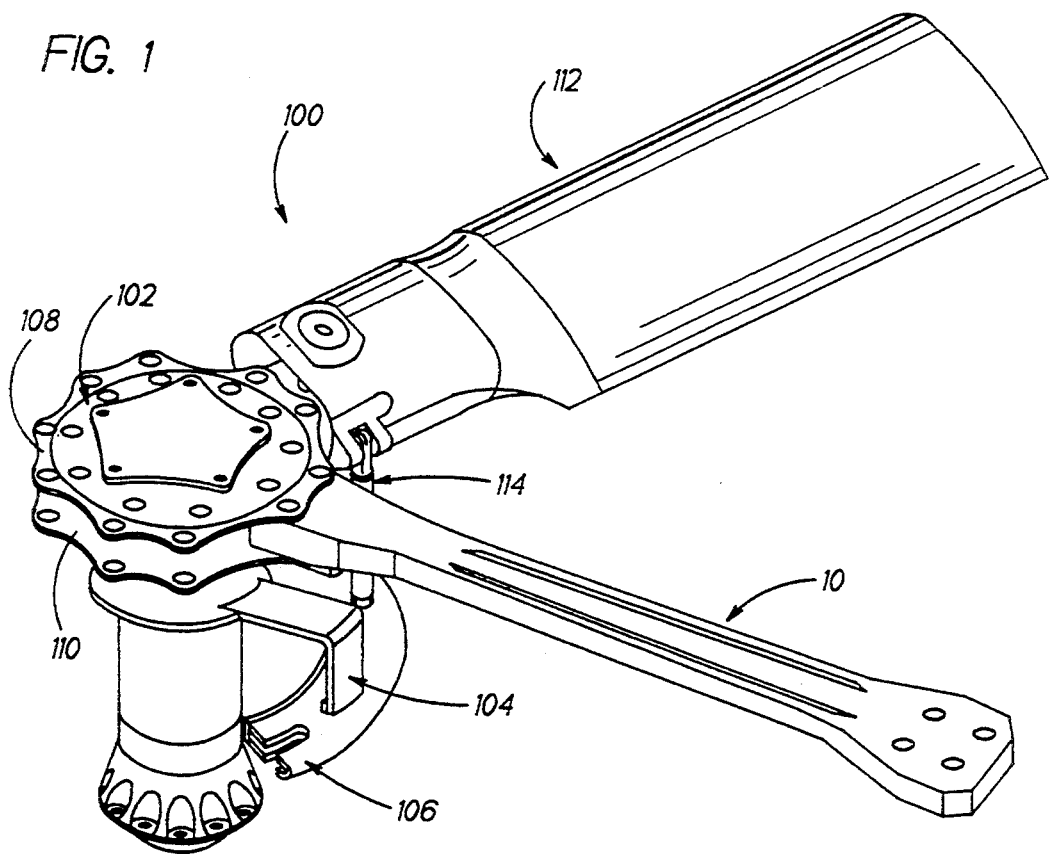
FIG. 1 is a perspective view of an exemplary bearingless main rotor hub assembly for a helicopter.
Figure 2:
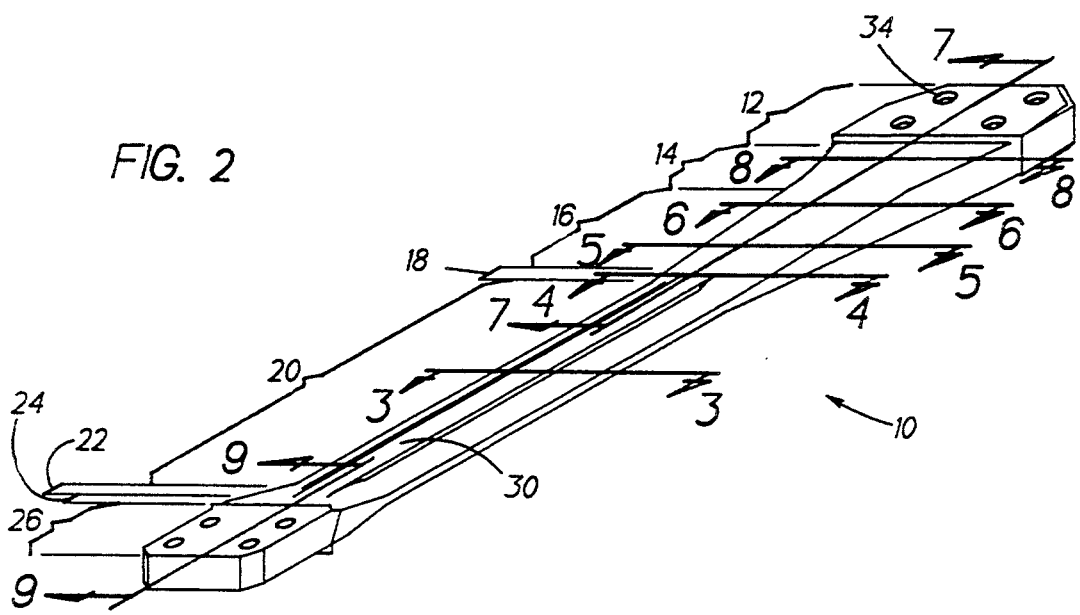
FIG. 2 is a perspective view of a hybrid composite flexbeam according to the present invention.

Referring now to the drawings wherein like reference characters identify corresponding or similar elements throughout the several views, FIGS. 1 and 2 illustrate a hybrid composite flexbeam 10 according to the present invention for a soft in-plane bearingless main rotor (BMR) assembly of a helicopter. An exemplary main rotor hub assembly 100 of a BMR assembly is depicted in FIG. 1. The BMR hub assembly 100 comprises a main rotor quill shaft 102 for transmitting engine torque to the main rotor blades (not shown) of the BMR assembly, a rotating scissors 104 and a rotating swashplate 106. The BMR hub assembly 100 further includes upper and lower plates 108, 110 which form a clevis. Each hybrid flexbeam 10 is secured in combination with the BMR hub assembly 100 by means of bolted connections utilizing the upper and lower plates 108, 110.

Each hybrid composite flexbeam 10 according to the present invention is encased within a torque tube 112, the outboard end of which is mechanically coupled to the corresponding main rotor blade (inboard end thereof) and the hybrid flexbeam 10 (outboard end thereof). The torque tube 112 provides the means for coupling cyclic and/or collective pitch inputs to the main rotor blade which is accommodated by the twisting motion of the corresponding hybrid flexbeam 10. A pitch control rod 114 is mechanically connected to the inboard end of the torque tube 112, and pitch inputs are coupled to the main rotor blades by means of the rotating scissors 104, rotating swashplate 106, pitch control rods 114, and torque tubes 112, respectively.

The hybrid composite flexbeam 10 according to the present invention is illustrated in further detail in FIG. 2 and comprises eight spanwise regions: a hub attachment region 12, a first inboard tapered region 14, a second inboard tapered region 16, an inboard transition region 18, a pitch region 20, an outboard transition region 22, an outboard tapered region 24, and a main rotor blade, torque tube (BT) attachment region 26. The pitch region 20 has a cruciform configuration that includes upper and lower raised ribs 30 as described in further detail hereinbelow. The first and second inboard tapered regions 14, 16 define a tapered flexural region 32 of the hybrid flexbeam 10 as described in further detail hereinbelow. The hub attachment region 12 includes apertures 34 for securing the flexbeam 10 in combination with the BMR hub assembly 100 (via the upper and lower plates 108, 110). The BT attachment region 26 includes apertures 36 for securing the flexbeam 10 in combination with the corresponding torque tube 112 and main rotor blade (not shown).

The hybrid composite flexbeam 10 according to the present invention is structurally optimized to simultaneously satisfy the bending strain, shear stress, buckling, and frequency constraints of a predefined BMR assembly (e.g., hub moment stiffness, first chordwise frequency limit, flapping limits, pitch input angle limits). The embodiment of the hybrid flexbeam 10 described herein was based upon a predefined BMR assembly having a head moment constant ≦4000 ft-lbs/deg, and the first chordwise frequency ≦0.710 cycle/rev, and the capability to accommodate ±5.3° of flapping motion and ±18.75° of induced pitch inputs.

The hybrid composite flexbeams 10 of the BMR assembly are configured to react the flapwise, chordwise, torsional, and centrifugal loads of the respective main rotor blades. Further, the hybrid flexbeams 10 are fabricated to accommodate the high bending strains resulting from high maneuver rotor loads and the high twisting strains due to cyclic and/or collective pitch inputs. Each region of the hybrid flexbeam 10 is structurally configured to perform a specific primary function, and, in addition, each region is coupled to the other regions and the functions thereof.

The hub attachment region 12 is configured to accommodate securement of the hybrid composite flexbeam 10 in combination with the BMR hub assembly 100. Functionally, the hub attachment region 12 is primarily designed to transfer flexbeam moments into the BMR hub assembly 100. Chordwise bending moments and centrifugal forces are reacted through the bolted connections of the hub attachment region 12. Flapwise moments are reacted by: (i) differential bending loading of the bolted connections, which produces axial tension and compression in the upper and lower plates 108, 110; and (ii) bending stresses in the upper and lower plates 108, 110. The tapered flexural region 32 defined by the first and second inboard tapered regions 14, 16 is structurally configured to achieve the effective flap hinge offset for the BMR hub assembly 100. The tapered flexural region 32, and in particular the second inboard tapered region 16 thereof, is structurally configured to react a portion of the elastic torsional displacements (induced pitch) of the hybrid flexbeam 10. The flexural region 32 also contributes to the tuning capability for the first lag frequency of the BMR assembly, e.g., about 0.71 cycle/rev for the described embodiment.

The inboard transition region 18 provides the transition between the cruciform configuration of the pitch region 20 and the rectangular cross-sectional configuration of the second inboard tapered region 16. The pitch region 20 is structurally configured to accommodate the major portion of the blade pitch displacement, i.e., elastic torsional displacements due to pitch inputs, and also contributes to the first lag mode frequency tuning. The outboard transition region 22 provides the transition between the cruciform configuration of the pitch region 20 and the rectangular cross-sectional configuration of the outboard tapered region 24. The BT attachment region 26 is configured to accommodate securement of the hybrid composite flexbeam 10 in combination with the corresponding torque tube 112 and main rotor blade. The centrifugal forces of the main rotor blade are reacted through the BT attachment region 26.

A pitch deflection capability is provided by the second inboard tapered region 16 of the tapered flexural transition region 32, in addition to the pitch region 20. By expanding the number of regions of the hybrid composite flexbeam 10 that accommodate a portion of the elastic torsional displacements thereof, a relatively low twist rate is achieved in the pitch region 20 of the hybrid flexbeam 10, allowing it to be structurally optimized, i.e., to be thick enough to preclude torsional buckling while still having acceptable torsional stress levels. The first inboard tapered region 14 is configured to provide both torsional stiffness and flexural capability. The second inboard tapered region 16 is configured to provide reduced torsional stiffness while concomitantly reacting the applied bending loads. The hybrid flexbeam 10 has a cross-sectional configuration that minimizes manufacturing risk while concomitantly maximizing torsional efficiency.

The hybrid composite flexbeam 10 according to the present invention is comprised of an admixture of composite plies (either prepregs or resin transfer molding (RTM)) embodying specific characteristics, which are layed-up in a predetermined manner, as described in further detail hereinbelow, to provide the hybrid flexbeam 10 having the characteristics described herein. A primary design constraint for the hybrid flexbeam 10 according to the present invention is ballistic survivability inasmuch as the hybrid flexbeam 10 is intended for use primarily in the BMR assemblies of helicopters having military applications. This design constraint dictated the use of composite plies having good ballistic tolerance characteristics, e.g., good fracture, toughness, and failure modes. One such composite material possessing good ballistic tolerance characteristics is fiberglass. In addition to possessing good ballistic tolerance characteristics, fiberglass also possesses good strain allowables. Fiberglass, however, has a low stiffness-to-weight ratio. Graphite, in contrast, which possesses poor fracture, toughness, and failure modes, i.e., poor ballistic tolerance characteristics, possesses good stress allowables, and has a high shear strength and a high stiffness-to-weight ratio.

The embodiment of the hybrid composite flexbeam 10 described herein has been fabricated utilizing fiberglass, toughened epoxy composite plies and graphite, toughened epoxy composite plies. In particular, the fiberglass plies are S2 fiberglass plies and the graphite plies are IM7 graphite plies. The fiberglass and graphite plies comprising the hybrid flexbeam 10 include both unidirectional plies, i.e., plies having fibers with a 0° orientation (spanwise), and cross plies, i.e., plies having fibers with a ±45° orientation. As described in the following paragraphs, unidirectional and cross plies of fiberglass and graphite are layed up to form the above-described regions of the hybrid flexbeam 10. While the embodiment of the hybrid-flexbeam 10 described in the following paragraphs is fabricated from fiberglass and graphite plies of the type described hereinabove, one skilled in the art will appreciate that the hybrid flexbeam 10 may be fabricated from other types of fiberglass and/or graphite as well as other composite materials that possess characteristics comparable to the fiberglass and graphite materials described hereinabove.

Figure 3:
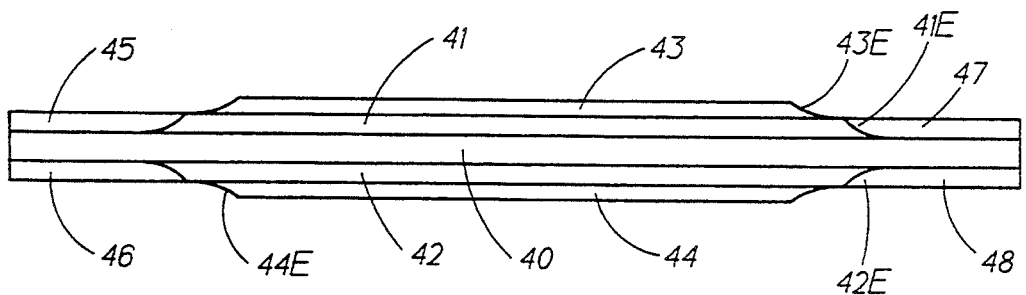
FIG. 3 is a transverse cross-sectional view of the pitch region of the hybrid composite flexbeam of FIG. 2, taken along line 3—3 thereof.

The pitch region 20 is the longest region (spanwise) of the hybrid composite flexbeam 10, and has a cruciform configuration as illustrated in further detail in FIG. 3. Unidirectional fiberglass and graphite plies 56, 58 (see FIGS. 7, 9) that extend from the root to the tip of the hybrid composite flexbeam 10, i.e., from the hub attachment region 12 through the BT attachment region 26, are layed-up to form nine ply zones that define the pitch region 20: a base zone 40, upper and lower internal zones 41, 42, upper and lower external zones 43, 44, and upper and lower, left and right side zones 45, 46, 47, 48. In addition to extending from root to tip of the hybrid flexbeam 10, the unidirectional graphite plies 58 forming the pitch region 20 have a constant width over the entire span of the hybrid flexbeam 10.

The base zone 40 has a rectangular configuration in cross section and is comprised of unidirectional fiberglass plies 56. The upper and lower internal zones 41, 42 are comprised of a 50/50 admixture of unidirectional fiberglass and graphite plies 56, 58. Preferably, the unidirectional fiberglass and graphite plies 56, 58 are layed-up in an alternating ply arrangement, i.e., fiberglass ply 56, graphite ply 58, fiberglass ply 56, etc. The 50/50 ply composition of the upper and lower internal zones 41, 42 mitigates the thermal incompatibility between the fiberglass base zone 40 and the upper and lower external zones 43, 44. The edges 41E, 42E of the upper and lower internal zones 41, 42 have a parabolic fillet configuration. The upper and lower, left and right side zones 45, 46, 47, 48 are complementarily configured to butt against the parabolic fillet edges 41E, 42E of the fiberglass and graphite plies 56, 58 forming the respective upper and lower internal zones 41, 42. The side zones 45, 46, 47, 48 are comprised of unidirectional fiberglass plies 56.

The upper and lower external zones 43, 44 are comprised of unidirectional graphite plies 58. The edges 43E, 44E of the upper and lower external zones 43, 44 have a parabolic fillet configuration which reduces the stress concentration $K_T$ due to inplane shearing. The upper and lower external zones 43, 44 of unidirectional graphite define the raised ribs 30 of the pitch region 20 illustrated in FIG. 2.

The pitch region 20 described hereinabove has a very low torsional stiffness. The pitch region 20 has a high flatwise (out-of-plane) stiffness as a result of locating the unidirectional graphite plies 58 at a maximum distance C from the beam neutral axis (see FIG. 7 wherein line NA—NA identifies the beam neutral axis). The high inplane shear strength of the graphite plies 58 allows the thickness of the pitch region 20 to be increased (as opposed to a pitch region formed solely from fiberglass plies). The zones 41, 42, 43, 44 comprised of unidirectional graphite plies 58 are narrower in width than the base zone 40 to minimize the chordwise (inplane) bending stiffness of the pitch region 20. The higher modulus of graphite (versus fiberglass) and the lay-up locations of the graphite plies 58 increase the flatwise stiffness of the pitch region 20 more than the chordwise stiffness. The low chordwise stiffness keeps the first chordwise natural frequency below 0.710 cycle/rev. The high flatwise stiffness precludes buckling due to ground loads.

The pitch region 20 experiences very low strains due to centrifugal force $C_F$ because of the higher modulus of the graphite plies (as compared to the fiberglass plies). The reduced width graphite plies 58 ensure good strain solutions in both the fiberglass and graphite plies 56, 58 since the graphite plies 58 are located in areas of reduced chordwise strain. The pitch region 20 comprises sufficient fiberglass plies to meet ballistic survivability requirements.

Figure 4:
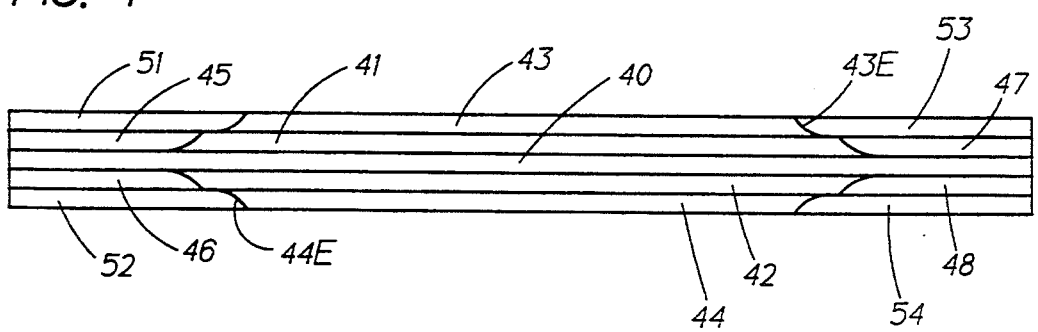
FIG. 4 is a transverse cross-sectional view of the inboard transition region of the hybrid composite flexbeam of FIG. 2, taken along line 4—4 thereof.

The inboard transition region 18 provides the transition between the cruciform configuration of the pitch region 20 and the rectangular cross-sectional configuration of the second inboard tapered region 16. With reference to FIG. 4, unidirectional fiberglass plies which extend inboardly to the root of the hybrid flexbeam 10 are layed-up to form upper and lower, left and right transition zones 51, 52, 53, 54 contiguous with the respective upper and lower external zones 43, 44 to provide a rectangular cross section for the inboard transition region 18. The fiberglass plies forming the transition zones 51, 52, 53, 54 are complementarily configured to butt against the parabolic fillet edges 43E, 44E of the respective upper and lower external zones 43, 44. The outboard transition region 22 of the hybrid composite flexbeam 10 is similarly configured.

The second inboard tapered region 16 provides two functions for the hybrid composite flexbeam 10. The tapered region 16 is a transitional region of unidirectional fiberglass and graphite plies of varying widths and thicknesses. The tapered region 16 has a comparatively low torsional stiffness to accommodate some of the elastic torsional displacements of the hybrid flexbeam 10, thereby reducing the peak twist rate in the pitch region 20. The tapered region 16 provides increasing flatwise and chordwise stiffness (in the inboard direction) to control placement of the effective hinge offset and the first chord frequency of the hybrid flexbeam 10.

Figure 7:
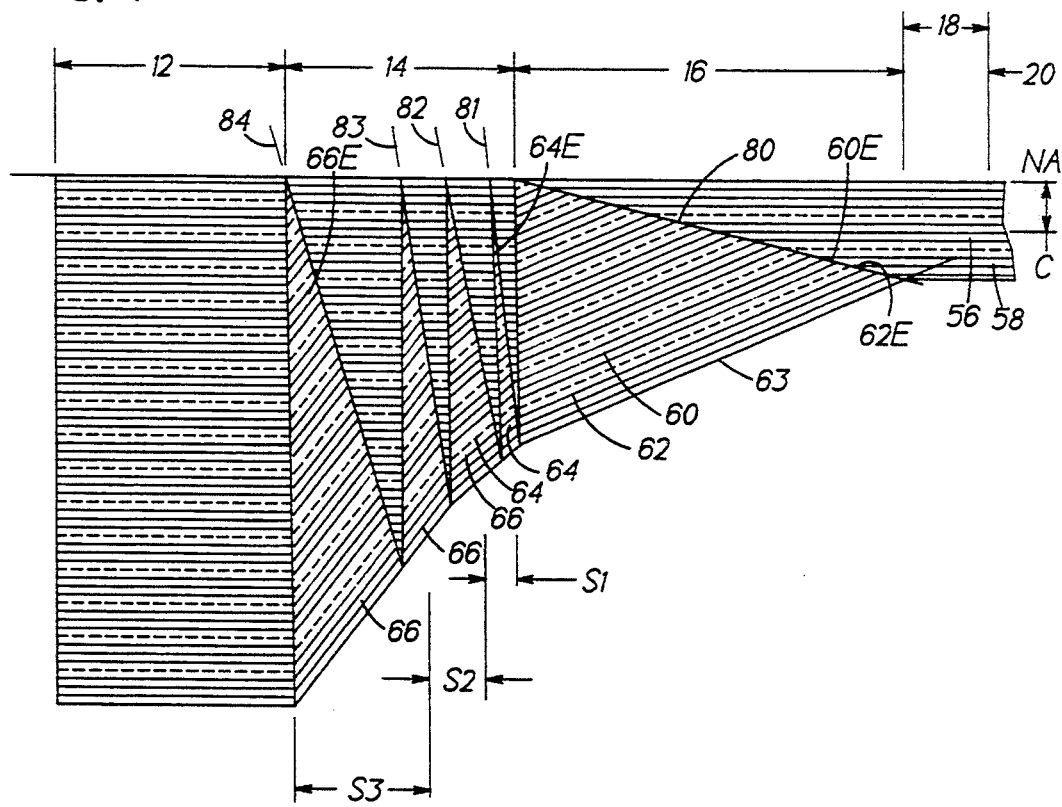
FIG. 7 is a spanwise cross-sectional view of the hybrid composite flexbeam of FIG. 2, taken along line 7—7 thereof.

In the second inboard tapered region 16, unidirectional fiberglass and graphite plies 60, 62 of varying lengths are internally interleaved in combination with the fiberglass and graphite plies extending inboardly from the inboard transition region 18, as illustrated generally in FIG. 7. Moving inboard from the juncture between the inboard transition region 18 and the second inboard tapered region 16, full width unidirectional plies are added internally, i.e., interleaved with the inboardly extending plies of the inboard transition region 18, starting near the beam surface and progressing towards the beam flatwise neutral axis (line NA—NA in FIG. 7). The interleaved plies 60, 62 extend inboardly to the root of the hybrid composite flexbeam 10.

The internally interleaved full width unidirectional plies are comprised of three spanwise strips. The left and right side strips are unidirectional fiberglass plies while the center strip comprises alternating plies of unidirectional fiberglass and unidirectional graphite. The cumulative effect of the internally interleaved unidirectional plies is graphically illustrated in FIGS. 5, 6 wherein FIG. 5 is a cross-sectional view of the second inboard tapered region 16 adjacent the juncture between the second inboard tapered region 16 and the inboard transition region 18 (non-dimensional station (N-DSTA) 0.1157 of the described embodiment of the hybrid composite flexbeam 10) and FIG. 6 is a cross-sectional view of the second inboard tapered region 16 adjacent the juncture between the second inboard tapered region 16 and the first inboard tapered region 14 (N-DSTA 0.0921).

Figure 5:
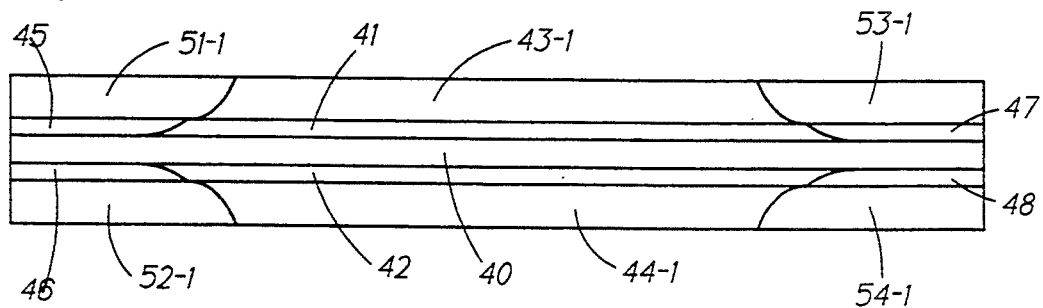
FIG. 5 is a transverse cross-sectional view of an outboard portion of the second inboard tapered region of the hybrid composite flexbeam of FIG. 2, taken along line 5—5 thereof.

With reference to FIG. 5, the full width unidirectional fiberglass and graphite plies interleaved near the beam surface in the second inboard tapered region 16 increase the thicknesses of the upper and lower external zones and the upper and lower, left and right transition zones (these zones are identified by reference numerals 43-1, 44-1, 51-1, 52-1, 53-1, 54-1, respectively, in FIG. 5). Since the side strips of the interleaved plies are all unidirectional fiberglass, the composition of the upper and lower, left and right transition zones 51-1, 52-1, 53-1, 54-1 remains unchanged, i.e., 100% fiberglass.

The composition of the upper and lower external zones 43-1, 44-1 is changed, however, since the center strips of the interleaved plies comprise alternating plies of fiberglass and graphite. The composition of the upper and lower external zones 43, 44 in the inboard transition region 18 is 100% unidirectional graphite. The composition of the upper and lower external zones 43-1, 44-1 in the outboard portion of the second inboard tapered region 16, in contrast, is A percent unidirectional graphite and B percent unidirectional fiberglass, wherein $A > B$, as a result of the internally interleaved plies 60, 62. For the described embodiment of the hybrid composite flexbeam 21, A is 69% and B is 31% at N-DSTA 0.1157.

Figure 6:
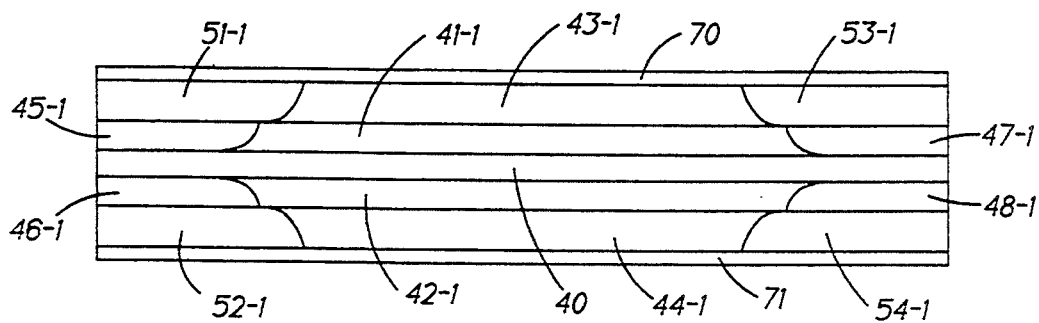
FIG. 6 is a transverse cross-sectional view of an inboard portion of the second inboard tapered region of the hybrid composite flexbeam of FIG. 2, taken along line 6—6 thereof.

With reference to FIG. 6, the unidirectional fiberglass and graphite plies internally interleaved near the beam neutral axis NA—NA in the second inboard tapered region 16 increase the thicknesses of the upper and lower internal zones and the upper and lower, left and right side zones (these zones are identified by reference numerals 41-1, 42-1, 45-1, 46-1, 47-1, 48-1, respectively, in FIG. 6). Since the side strips of the interleaved plies are all unidirectional fiberglass, the composition of the upper and lower, left and right side zones 45-1, 46-1, 47-1, 48-1 remains unchanged, i.e., 100% fiberglass.

The composition of the upper and lower internal zones 41-1, 42-1 is changed, however, since the center strips of the interleaved plies comprise alternating plies of fiberglass and graphite. The composition of the upper and lower internal zones 41, 42 in the inboard transition region 18 is 50% unidirectional fiberglass, 50% unidirectional graphite. The composition of the upper and lower internal zones 41-1, 42-1 in the inboard portion of the second inboard tapered region 16, in contrast, is C percent unidirectional graphite and D percent unidirectional fiberglass, wherein $C<D$, as a result of the internally interleaved plies 60, 62. For the described embodiment of the hybrid composite flexbeam 21, C is 43% and D is 57% at N-DSTA 0.0921.

In addition to the internally interleaved plies of unidirectional fiberglass and graphite 60, 62, full width unidirectional fiberglass plies 63 are layed-up on the external surfaces of the second inboard tapered region 16, i.e., the upper and lower external zones 43-1, 44-1 and the upper and lower, left and right transition zones 51-1, 52-1, 53-1, 54-1. The superposed unidirectional fiberglass plies 63 form upper and lower surface zones 70, 71 (see FIG. 6) extending inboardly to the root of the hybrid composite flexbeam 10 that effectively "bury" the upper and lower external zones 43-1, 44-1 and the upper and lower, left and right transition zones 51-1, 52-1, 53-1, 54-1. The surface zones 70, 71 create an optimum cross section wherein the unidirectional fiberglass and graphite plies have the same analytical fatigue lives.

The first inboard tapered region 14 is configured to provide both torsional stiffness and flexural capability. In addition, the tapered region 14 provides the transition between the unidirectional fiberglass and graphite plies forming the second inboard tapered region 16 and the ply configuration of the hub attachment region 12 described hereinbelow.

Full width fiberglass and graphite cross plies 64, 66 of varying lengths are uniformly interleaved in combination with the unidirectional fiberglass and graphite plies extending inboardly from the second inboard tapered region 16, as illustrated generally in FIG. 7. Interleaving of the cross plies 64, 66 begins near the beam surface and progresses towards the beam neutral axis NA—NA so that the cross plies 64, 66 are uniformly distributed across the beam thickness. The interleaved distribution of the fiberglass cross plies 64 provides a gradual thermal transition between the thermally incompatible unidirectional fiberglass plies and the graphite cross plies 66. The interleaved cross plies 64, 66 extend inboardly to the root of the hybrid composite flexbeam 10.

The distribution scheme for the interleaved fiberglass and graphite cross plies 64, 66 is illustrated in FIG. 7 and comprises three transition segments: S1, S2, and S3. Fiberglass cross plies 64 are uniformly interleaved through the beam thickness over the first transition segment S1. Both fiberglass cross plies 64 and graphite cross plies 66 are uniformly interleaved through the beam thickness over the second transition segment S2. First and second sets of graphite cross plies 66 are uniformly interleaved through the beam thickness over distinct portions of the third transition segment S3 as illustrated in FIG. 7. For the described embodiment of the hybrid composite flexbeam 10, the first transition segment S1 is about 25 mm, the second transition segment S2 is about 25 mm, and the third transition segment S3 is about 150 mm (50 mm for the first set of graphite cross plies 66 and 100 mm for the second set of graphite cross plies 66).

Figure 8:
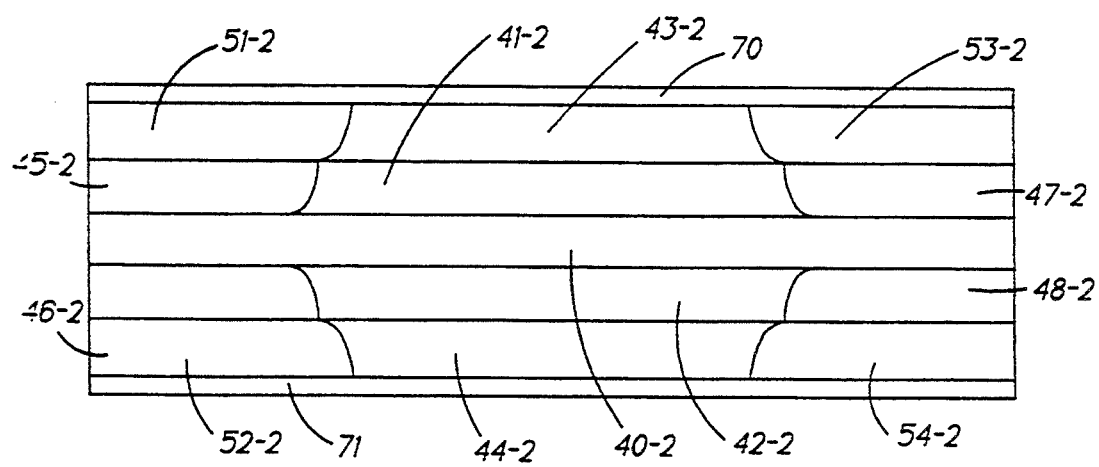
FIG. 8 is a transverse cross-sectional view of the first inboard tapered region of the hybrid composite flexbeam of FIG. 2, taken along line 8—8 thereof.

The interleaved fiberglass and graphite cross plies 64, 66 increase the thicknesses and alter the compositions of the base zone, the upper and lower internal zones, the upper and lower external zones, the upper, lower, left and right side zones, and the upper, lower, left and right transition zones (these zones are identified in FIG. 8 by reference numerals 40-2, 41-2, 42-2, 43-2, 44-2, 45-2, 46-2, 47-2, 48-2, 51-2, 52-2, 53-2, 54-2, respectively). Of particular interest, the composition of the upper and lower external zones 43-2, 44-2 is E percent unidirectional graphite, F percent cross-ply graphite, G percent unidirectional fiberglass, and H percent cross-ply fiberglass wherein $E>F>G>H$; the composition of the upper and lower internal zones 41-2, 42-2 is I percent unidirectional fiberglass, J percent unidirectional graphite, K percent cross-ply graphite, and L percent cross-ply fiberglass wherein $I>J>K>L$; and the composition of the base zone 40-2 is M percent unidirectional fiberglass, N percent cross-ply graphite, O percent cross-ply fiberglass, and P percent unidirectional graphite wherein $M>N>O>P$. For the described embodiment of the hybrid composite flexbeam 10 (at N-DSTA 0.0611) E=40%, F=30%, G=19%, and H=11%; I=35%, J=28%, K=27% and L=10%; and M=47%, N=23% O=17% and P=13%.

However, since the side strips of the base zone 40-2 do not contain unidirectional graphite plies 62, the percentage of unidirectional graphite in the central strip (as indicated by the dashed lines in FIG. 8, is actually higher than P percent. For the described embodiment, the percentage of unidirectional graphite in the central strip is 19% (versus 13% unidirectional graphite in the base zone 40-2 overall).

The inboardly extending unidirectional fiberglass and graphite plies 56, 58 of the pitch region 20, in combination with the inboardly extending unidirectional fiberglass plies added in the inboard transition region 18, the inboardly extending interleaved unidirectional fiberglass and graphite plies 60, 62, 63 added in the second inboard tapered region 16, and the inboardly extending interleaved fiberglass and graphite cross plies 64, 66 added in the first inboard tapered region 14, provide an optimal ply configuration for the hub attachment region 12 that facilitates the bolted connection of the hub attachment region 12 in combination with the BMR hub assembly 100. The ply configuration of the hub attachment region 12 is a substantially 50/50 admixture of unidirectional plies and cross plies of fiberglass and graphite. Such a ply configuration provides high torsional stiffness, good flexural strength, and superior attachment strengths.

The outboard tapered region 24 is similar in configuration to the first inboard tapered region 14. The outboard tapered region 24 provides the transition between the unidirectional fiberglass and graphite plies extending outboardly from the outboard transition region 22 and the ply configuration of the BT attachment region 26 described hereinbelow.

Figure 9:
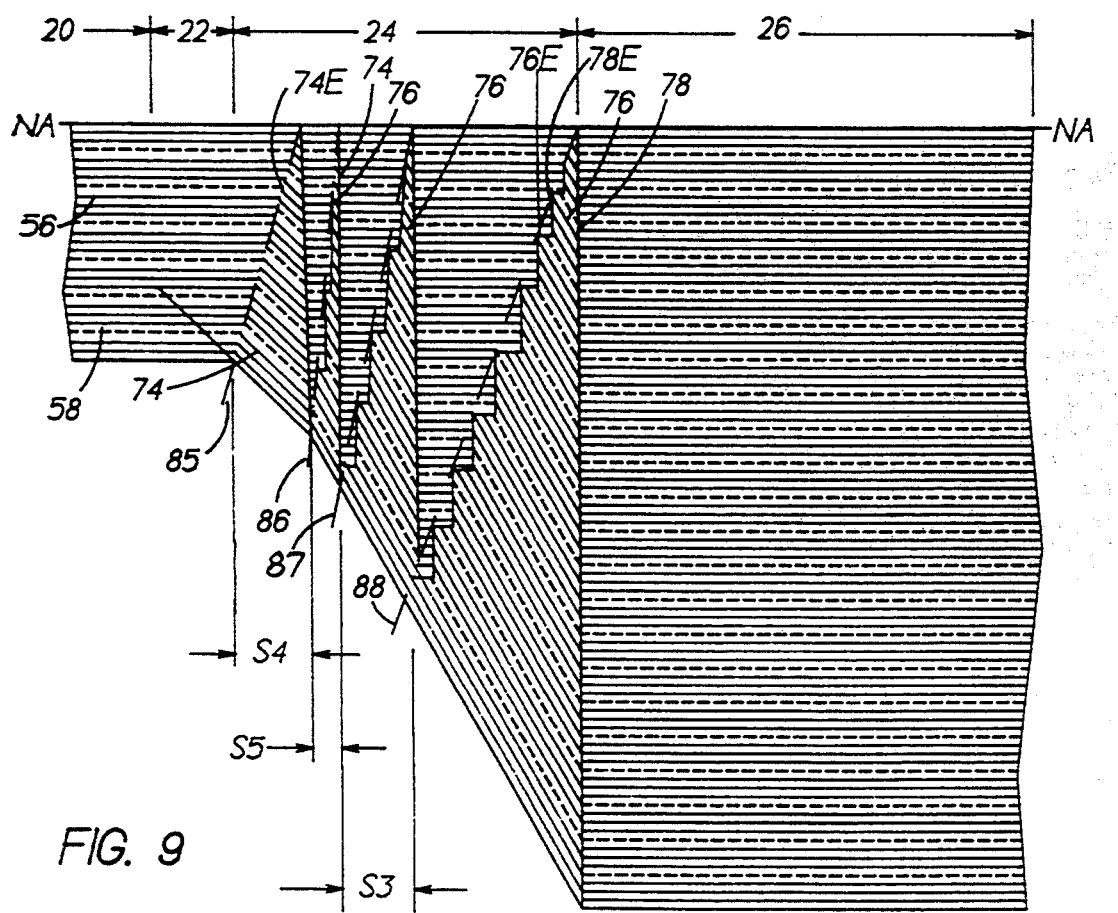
FIG. 9 is a spanwise cross-sectional view of the hybrid composite flexbeam of FIG. 2, taken along line 9—9 thereof.

Full width fiberglass and graphite cross plies 74, 76 of varying lengths, as well as unidirectional fiberglass plies 78 of varying lengths, are uniformly interleaved in combination with the unidirectional fiberglass and graphite plies extending outboardly from the outboard transition region 22, as illustrated generally in FIG. 9. Interleaving of the cross plies 74, 76 and the unidirectional plies 78 begins near the beam surface and progresses toward the beam neutral axis NA—NA so that the cross plies 74, 76 and the unidirectional plies 78 are uniformly distributed across the beam thickness. The interleaved distribution of the fiberglass and graphite cross plies 74, 76 and the unidirectional fiberglass plies 78 provides a gradual thermal transition between the thermally incompatible unidirectional fiberglass plies and the graphite cross plies 76. The interleaved cross plies 74, 76 and unidirectional plies 78 extend outboardly to the tip of the hybrid composite flexbeam 10.

The distribution scheme for the interleaved fiberglass and graphite cross plies 74, 76 and the unidirectional fiberglass plies 78 is illustrated in FIG. 9 and comprises four transition segments: S4, S5, S6, and S7. Fiberglass cross plies 74 are uniformly interleaved through the beam thickness over the fourth transition segment S4. Both fiberglass cross plies 74 and graphite cross plies 76 are uniformly interleaved through the beam thickness over the fifth transition segment S5. Graphite cross plies 76 are uniformly interleaved through the beam thickness over the sixth transition segment S6. Graphite cross plies 76 and unidirectional fiberglass plies 78 are uniformly interleaved through the beam thickness over the seventh transition segment S7. The unidirectional fiberglass plies 78 are added to provide the ply configuration for the BT attachment region 26 described in the following paragraph.

The outboardly extending unidirectional fiberglass and graphite plies 56, 58 of the pitch region 20, in combination with the outboardly extending unidirectional fiberglass plies added in the outboard transition region 22 and the outboardly extending interleaved fiberglass and graphite cross plies 74, 76 and the unidirectional fiberglass plies 78 added in the outboard tapered region 24, provide the ply configuration for the BT attachment region 26 that facilitates the bolted connection of the respective torque tube 112 and main rotor blade in combination with the BT attachment region 26. The ply configuration of the BT attachment region 26 is a substantially 50/50 admixture of unidirectional plies and cross plies of fiberglass and graphite. Such a ply configuration provides high torsional stiffness, good flexural strength, and superior attachment strengths.

Figure 10:
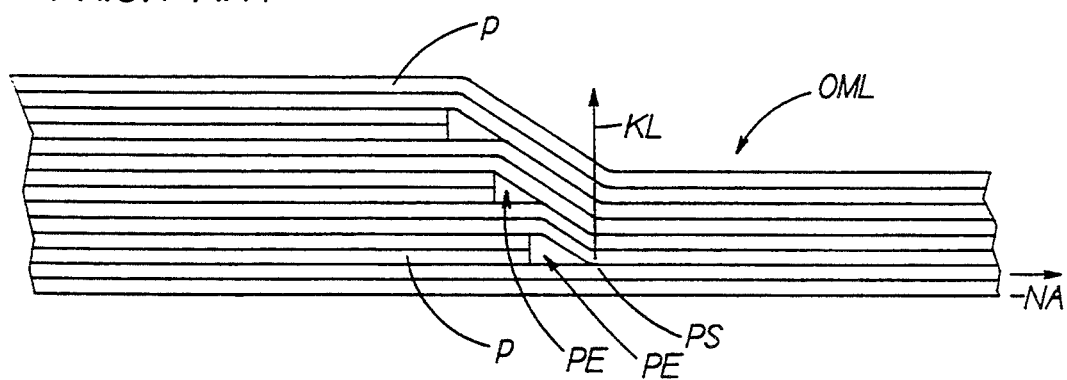
FIG. 10 is a partial cross-sectional view illustrating a conventional ply drop-off arrangement.

As described in the preceding paragraphs, the fiberglass and graphite cross plies 64, 66 interleaved in the first inboard tapered region 14, the unidirectional fiberglass and graphite plies 60, 62 interleaved in the second inboard tapered region 16, and the fiberglass and graphite cross plies 74, 76 and the unidirectional fiberglass plies 78 interleaved in the outboard tapered region 24 have varying lengths. The ends of such interleaved plies, identified by reference characters 64E, 66E, 60E, 62E, 74E, 76E, 78E, respectively, in FIGS. 7, 9, define distributed ply drop-off arrangements (identified by reference characters 80-88 and the corresponding dashed lines in FIGS. 7, 9) in the first inboard tapered region 14, the second inboard tapered region 16, and the outboard tapered region 24, respectively. The unique ply configuration of the hybrid composite flexbeam 10 according to the present invention results in kick loads being distributed along the distributed ply drop-off arrangements 80-88 defined by the interleaved ply endings 64E, 66E, 60E, 62E, 74E, 76E, 78E, rather than summing at a localized line of action, as in conventional ply drop-off arrangements. FIG. 10 illustrates a conventional ply drop-off arrangement in a tapered region, and FIG. 11 is an enlarged view of the distributed ply drop-off arrangement of the interleaved ply ends 60E, 62E of the second inboard tapered region 16 of the hybrid flexbeam 10 according to the present invention.

With reference to FIG. 10, individual composite plies P are layed-up from the mold centerline towards the OML in a conventional ply lay-up technique. Selected plies P have terminated ends PE which form the ply drop-off arrangement illustrated in FIG. 10. The point PS of highest combined shear (chordwise shear and interlaminar shear due to the ply endings PE), as a result of the arrangement of the terminated ends PE of the layed-up composite plies P, is adjacent the innermost terminated ply endings PE. The highest tension stress as a result of the conventional ply lay-up technique is at the innermost composite ply P. The net effect of the conventional ply lay-up technique and the arrangement of terminated ply endings PE is additive vis-a-vis tension stress, which results in an effective kick load KL acting through a single line of action, as illustrated in FIG. 10. The effect of the concentrated kick load KL is to split or separate the individual plies P forming the buildup.

In the hybrid composite flexbeam 10 according to the present invention, in contrast, the interleaved plies added in the second inboard tapered region 16, the first inboard tapered region 14, and the outboard tapered region 24 are layed-up beginning near the OML of the hybrid flexbeam 10 towards the mold centerline (flexbeam neutral axis NA—NA). The ply endings of adjacent interleaved plies are disposed to form the respective ply drop-off arrangements 80-88 described hereinabove and illustrated in FIGS. 7, 9.

Figure 11:
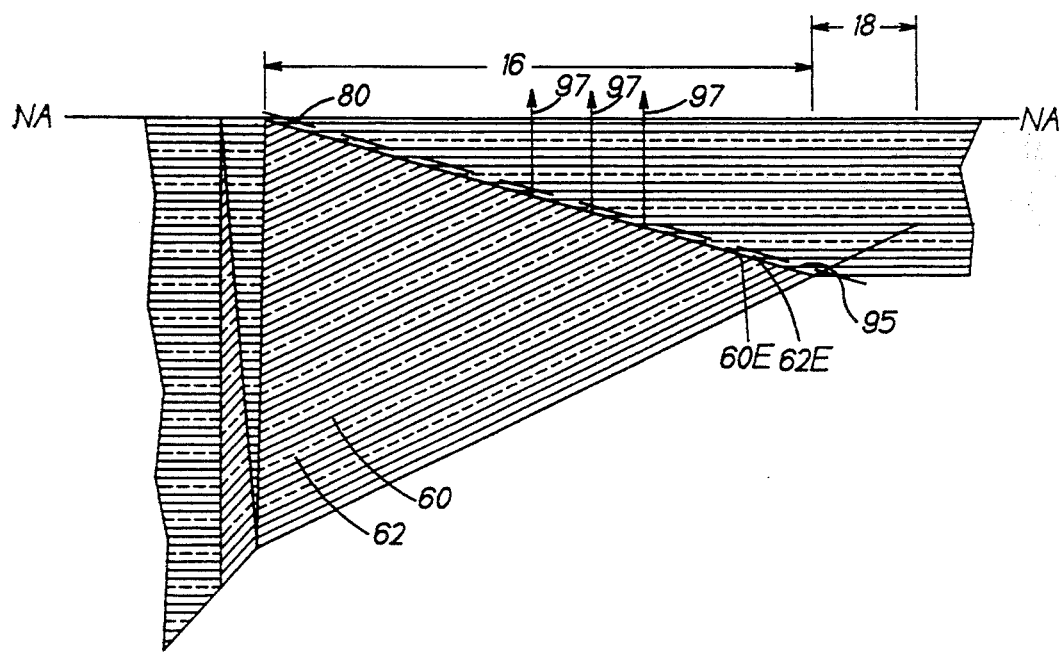
FIG. 11 is a partial cross-sectional view of the second inboard tapered region of FIG. 7 illustrating one exemplary distributed ply drop-off arrangement of the hybrid composite flexbeam according to the present invention.

With reference to FIG. 11, the ply endings 60E, 62E of the unidirectional fiberglass and graphite plies 60, 62 interleaved in the second inboard tapered region 16 form the distributed ply drop-off arrangement 80. The ply ending 60E of an interleaved unidirectional fiberglass ply 60 extends over the ply ending 62E of the adjacent interleaved unidirectional graphite ply 62. The point of highest bending strain resulting from the lay-up configuration of the interleaved plies 60, 62 and the distributed arrangement 80 of ply endings 60E, 62E according to the present invention is identified by reference numeral 95 in FIG. 11 and is proximate the outer mold line OML of the second inboard tapered region 16. This results in a non-additive distribution of kick loads (identified by reference numeral 97 in FIG. 11—only three individual kick loads 97 are illustrated in FIG. 11 for purposes of explication) over the unidirectional fiberglass and graphite plies 60, 62 interleaved in the second inboard tapered region 16.

In consequence, there is no strength reduction in the ply buildup comprising the second inboard tapered region 16 according to the present invention as a result of the ply endings 60E, 62E. The net result is a stronger second inboard tapered region 16. The other distributed ply drop-off arrangements 81-84, 85-88 described hereinabove provide similar effects for the first inboard tapered region 14 and the outboard tapered region 24, respectively, of the hybrid composite flexbeam 10.

Figure 12A:
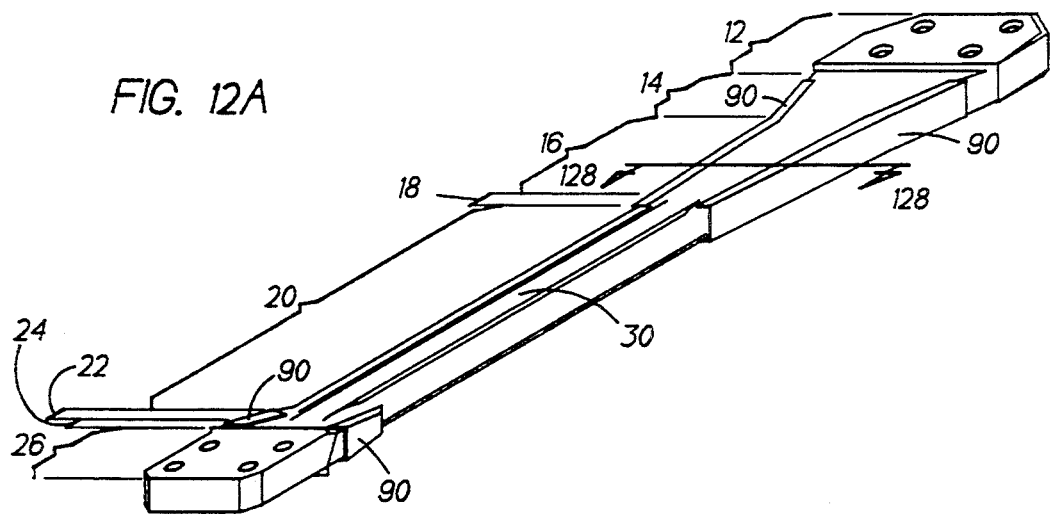
FIG. 12A is a perspective view of an alternative embodiment of the hybrid composite flexbeam according to the present invention incorporating leading and trailing edge end caps.
Figure 12B:
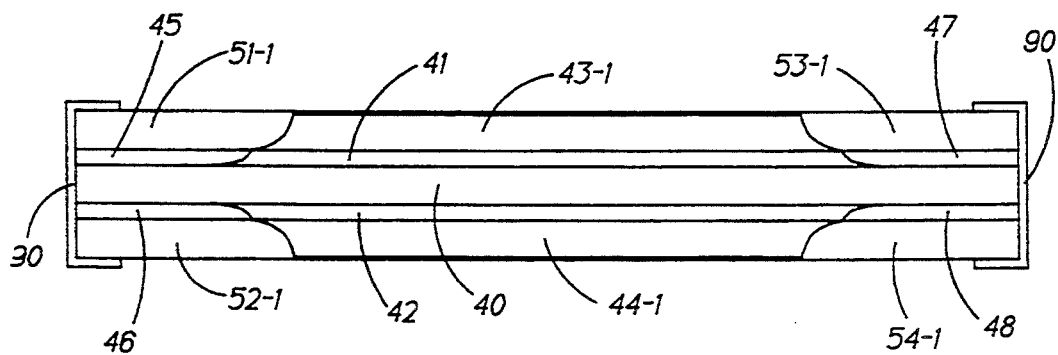
FIG. 12B is a transverse cross-sectional view of the outboard portion of the second inboard tapered region of the hybrid composite flexbeam of FIG. 12A, taken along line 12B—12B thereof.

An alternative embodiment of a hybrid composite flexbeam 10' according to the present invention is exemplarily illustrated in FIGS. 12A, 12B. The hybrid flexbeam 10' has a ply configuration equivalent to the ply configuration of the hybrid composite flexbeam 10 described hereinabove, i.e., unidirectional and cross plies of fiberglass and graphite. The hybrid flexbeam 10' further includes fiberglass edge caps 90 having a U-shaped configuration disposed in combination with selected portions of the leading and trailing edges of the hybrid flexbeam 10'. Preferably, the fiberglass edge caps 90 are fabricated with fiber orientations of ±45°.

The edge caps 90 start at the inboard and outboard limits of the pitch region 20 and extend inboardly and outboardly, respectively, to termination points in areas of relatively low strain, i.e., the first inboard tapered region 14 and the outboard tapered region 24, respectively, as illustrated generally in FIG. 12A. The edge caps 90 are operative to prevent the splinter-type fracture mode generally associated with width transitions in composite structures.

A variety of modifications and variations of the present invention are possible in light of the above teachings. It is therefore to be understood that, within the scope of the appended claims, the present invention may be practiced otherwise than as specifically described hereinabove.

What is claimed is:

1. A hybrid composite flexbeam for a bearingless main rotor assembly, comprising:
    a pitch region formed by a plurality of unidirectional fiberglass plies, a plurality of unidirectional fiberglass and graphite plies in interleaved combination, and a plurality of unidirectional graphite plies, said plurality of unidirectional graphite plies defining a cruciform configuration in cross section for said pitch region, and wherein said plurality of unidirectional fiberglass plies, said plurality of unidirectional fiberglass and graphite plies, and said plurality of unidirectional graphite plies extend from root to tip of said hybrid composite flexbeam;
    an inboard transition region comprised of unidirectional fiberglass plies in abutting relation with edges of said plurality of unidirectional graphite plies defining said cruciform configuration, said abutting unidirectional fiberglass plies extending inboardly to said root of said hybrid flexbeam;
    a second inboard tapered region formed by a plurality of unidirectional fiberglass and graphite plies of varying lengths internally interleaved in combination with said plurality of unidirectional fiberglass plies, said plurality of unidirectional fiberglass and graphite plies, said plurality of unidirectional graphite plies, and said plurality of abutting unidirectional fiberglass plies extending inboardly from said inboard transition region, said plurality of internally interleaved unidirectional fiberglass and graphite plies of varying lengths extending inboardly to said root of said hybrid composite flexbeam;
    a first inboard tapered region formed by a plurality of fiberglass and graphite cross plies of varying lengths internally interleaved in combination with said plurality of unidirectional fiberglass plies, said plurality of unidirectional fiberglass and graphite plies, said plurality of unidirectional graphite plies, said plurality of internally interleaved unidirectional fiberglass and graphite plies of varying lengths, and said plurality of abutting unidirectional fiberglass plies extending inboardly from said second inboard tapered region, said plurality of internally interleaved fiberglass and graphite cross plies of varying lengths extending inboardly to said root of said hybrid composite flexbeam;
    a hub attachment region formed by said plurality of unidirectional fiberglass plies, said plurality of unidirectional fiberglass and graphite plies, said plurality of unidirectional graphite plies, said plurality of internally interleaved unidirectional fiberglass and graphite plies of varying lengths, said plurality of internally interleaved fiberglass and graphite cross plies of varying lengths, and said plurality of abutting unidirectional fiberglass plies extending inboardly from said first inboard tapered region;
    an outboard transition region comprised of unidirectional fiberglass plies in abutting relation with edges of said plurality of unidirectional graphite plies defining said cruciform configuration, said abutting unidirectional fiberglass plies extending outboardly to said tip of said hybrid flexbeam;
    an outboard tapered region formed by a plurality of fiberglass and graphite cross plies and a plurality of unidirectional fiberglass plies of varying lengths interleaved in combination with said plurality of unidirectional fiberglass plies, said plurality of unidirectional fiberglass and graphite plies, said plurality of unidirectional graphite plies, and said plurality of abutting unidirectional fiberglass plies extending outboardly from said outboard transition region, said plurality of internally interleaved fiberglass and graphite cross plies and said plurality of internally interleaved unidirectional fiberglass plies of varying lengths extending outboardly to said tip of said hybrid composite flexbeam; and
    a torque tube, main rotor blade attachment region formed by said plurality of unidirectional fiberglass plies, said plurality of unidirectional fiberglass and graphite plies, said plurality of unidirectional graphite plies, said plurality of internally interleaved fiberglass and graphite cross plies and said plurality of internally interleaved unidirectional fiberglass plies of varying lengths, and said plurality of abutting unidirectional fiberglass plies extending outboardly from said outboard tapered region.

2. A hybrid composite flexbeam for a bearingless main rotor assembly, comprising:
    a pitch region formed by a plurality of unidirectional fiberglass plies, a plurality of unidirectional fiberglass and graphite plies in interleaved combination, and a plurality of unidirectional graphite plies, said plurality of unidirectional graphite plies defining a cruciform configuration in cross section for said pitch region, and wherein said plurality of unidirectional fiberglass plies, said plurality of unidirectional fiberglass and graphite plies, and said plurality of unidirectional graphite plies extend from root to tip of said hybrid composite flexbeam;
    an inboard transition region comprised of unidirectional fiberglass plies in abutting relation with edges of said plurality of unidirectional graphite plies defining said cruciform configuration, said abutting unidirectional fiberglass plies extending inboardly to said root of said hybrid flexbeam;

a second inboard tapered region formed by a plurality of unidirectional fiberglass and graphite plies of varying lengths internally interleaved in combination with said plurality of unidirectional fiberglass plies, said plurality of unidirectional fiberglass and graphite plies, said plurality of unidirectional graphite plies, and said plurality of abutting unidirectional fiberglass plies extending inboardly from said inboard transition region, said plurality of internally interleaved unidirectional fiberglass and graphite plies of varying lengths extending inboardly to said root of said hybrid composite flexbeam;

a first inboard tapered region formed by a plurality of fiberglass and graphite cross plies of varying lengths internally interleaved in combination with said plurality of unidirectional fiberglass plies, said plurality of unidirectional fiberglass and graphite plies, said plurality of unidirectional graphite plies, said plurality of internally interleaved unidirectional fiberglass and graphite plies of varying lengths, and said plurality of abutting unidirectional fiberglass plies extending inboardly from said second inboard tapered region, said plurality of internally interleaved fiberglass and graphite cross plies of varying lengths extending inboardly to said root of said hybrid composite flexbeam;

a hub attachment region formed by said plurality of unidirectional fiberglass plies, said plurality of unidirectional fiberglass and graphite plies, said plurality of unidirectional graphite plies, said plurality of internally interleaved unidirectional fiberglass and graphite plies of varying lengths, said plurality of internally interleaved fiberglass and graphite cross plies of varying lengths, and said plurality of abutting unidirectional fiberglass plies extending inboardly from said first inboard tapered region;

an outboard transition region comprised of unidirectional fiberglass plies in abutting relation with edges of said plurality of unidirectional graphite plies defining said cruciform configuration, said abutting unidirectional fiberglass plies extending outboardly to said tip of said hybrid flexbeam;

an outboard tapered region formed by a plurality of fiberglass and graphite cross plies and a plurality of unidirectional fiberglass plies of varying lengths interleaved in combination with said plurality of unidirectional fiberglass plies, said plurality of unidirectional fiberglass and graphite plies, said plurality of unidirectional graphite plies, and said plurality of abutting unidirectional fiberglass plies extending outboardly from said outboard transition region, said plurality of internally interleaved fiberglass and graphite cross plies and said plurality of internally interleaved unidirectional fiberglass plies of varying lengths extending outboardly to said tip of said hybrid composite flexbeam;

a torque tube, main rotor blade attachment region formed by said plurality of unidirectional fiberglass plies, said plurality of unidirectional fiberglass and graphite plies, said plurality of unidirectional graphite plies, said plurality of internally interleaved fiberglass and graphite cross plies and said plurality of internally interleaved unidirectional fiberglass plies of varying lengths, and said plurality of abutting unidirectional fiberglass plies extending outboardly from said outboard tapered region; and a plurality of fiberglass edge caps having a U-shaped configuration disposed in combination the leading and trailing edges of said hybrid composite flexbeam, respectively, said plurality of fiberglass edge caps having fiber orientations of ±45°, and wherein said plurality of fiberglass edge caps include a first fiberglass edge cap disposed in combination with the leading edge of said hybrid composite flexbeam from the outboard limit of said inboard transition region into said first inboard tapered region, a second fiberglass edge cap disposed in combination with the trailing edge of said hybrid composite flexbeam from the outboard limit of said inboard transition region into said first inboard tapered region, a third fiberglass edge cap disposed in combination with the leading edge of said hybrid composite flexbeam from the inboard limit of said outboard transition region into said outboard tapered region, and a fourth fiberglass edge cap disposed in combination with the trailing edge of said hybrid composite flexbeam from the inboard limit of said outboard transition region into said outboard tapered region.

3. A hybrid composite flexbeam for a bearingless main rotor assembly, comprising:

a pitch region formed by a plurality of unidirectional fiberglass plies, a plurality of unidirectional fiberglass and graphite plies in interleaved combination, and a plurality of unidirectional graphite plies, said plurality of unidirectional graphite plies defining a cruciform configuration in cross section for said pitch region, and wherein said plurality of unidirectional fiberglass plies, said plurality of unidirectional fiberglass and graphite plies, and said plurality of unidirectional graphite plies extend from root to tip of said hybrid composite flexbeam;

a second inboard tapered region formed by a plurality of unidirectional fiberglass and graphite plies of varying lengths internally interleaved in combination with said plurality of unidirectional fiberglass plies, said plurality of unidirectional fiberglass and graphite plies, and said plurality of unidirectional graphite plies extending inboardly from said pitch region, said plurality of internally interleaved unidirectional fiberglass and graphite plies of varying lengths extending inboardly to said root of said hybrid composite flexbeam;

a first inboard tapered region formed by a plurality of fiberglass and graphite cross plies of varying lengths internally interleaved in combination with said plurality of unidirectional fiberglass plies, said plurality of unidirectional fiberglass and graphite plies, said plurality of unidirectional graphite plies, and said plurality of internally interleaved unidirectional fiberglass and graphite plies of varying lengths extending inboardly from said second inboard tapered region, said plurality of internally interleaved fiberglass and graphite cross plies of varying lengths extending inboardly to said root of said hybrid composite flexbeam;

a hub attachment region formed by said plurality of unidirectional fiberglass plies, said plurality of unidirectional fiberglass and graphite plies, said plurality of unidirectional graphite plies, aid plurality of internally interleaved unidirectional fiberglass and graphite plies of varying lengths, and said plurality of internally interleaved fiberglass and graphite cross plies of varying lengths extending inboardly from said first inboard tapered region;

an outboard tapered region formed by a plurality of fiberglass and graphite cross plies and a plurality of unidirectional fiberglass plies of varying lengths interleaved in combination with said plurality of unidirectional fiberglass plies, said plurality of unidirectional fiberglass and graphite plies, and said plurality of unidirectional graphite plies extending outboardly from said pitch region, said plurality of internally interleaved fiberglass and graphite cross plies and said plurality of internally interleaved unidirectional fiberglass plies of varying lengths extending outboardly to said tip of said hybrid composite flexbeam; and a torque tube, main rotor blade attachment region formed by said plurality of unidirectional fiberglass plies, said plurality of unidirectional fiberglass and graphite plies, said plurality of unidirectional graphite plies, and said plurality of internally interleaved fiberglass and graphite cross plies and said plurality of internally interleaved unidirectional fiberglass plies of varying lengths extending outboardly from said outboard tapered region.

4. The hybrid composite flexbeam of claim 3 wherein said pitch region comprises:

a base zone formed from said plurality of unidirectional fiberglass plies, said base zone having a rectangular configuration of predetermined width in cross section;

upper and lower internal zones formed from said interleaved plurality of unidirectional fiberglass and graphite plies, said upper and lower internal zones being contiguous with said base zone;

upper and lower, left and right side zones formed from said unidirectional fiberglass plies, said upper and lower, left and right side zones being contiguous with said base zone and disposed in abutting relation with said upper and lower internal zones, respectively;

wherein said upper and lower internal zones and said upper and lower, left and right side zones in combination have a rectangular configuration of said predetermined width in cross section; and upper and lower external zones formed from said interleaved plurality of unidirectional graphite plies, said upper and lower external zones being contiguous with said upper and lower internal zones, respectively, and wherein said upper and lower external zones have a width less than said predetermined width.

5. The hybrid composite flexbeam of claim 4 wherein said upper and lower external zones have edges defining said width thereof, and wherein said edges have a parabolic fillet configuration.

6. The hybrid composite flexbeam of claim 5 further comprising an inboard transition region intermediate said pitch region and said second inboard tapered region, said inboard transition region being formed from unidirectional fiberglass plies to define upper and lower, left and right transition zones contiguous with said upper and lower, left and right side zones and said upper and lower internal zones, respectively, said upper and lower, left and right transition zones having edges having a configuration complementary to parabolic fillet edges of said upper and lower external zones wherein said edges of said upper and lower, left and right transition zones butt against said parabolic fillet edges of said upper and lower external zones, respectively.

7. The hybrid composite flexbeam of claim 6 wherein said second inboard tapered region further comprises first and second pluralities of full width plies of unidirectional fiberglass superposed upon the upper and lower external surfaces, respectively, of said second inboard tapered region, to form upper and lower surface zones, respectively, that effectively bury said upper and lower external zones and said upper and lower, left and right transition zones, respectively, said first and second superposed pluralities of full width unidirectional fiberglass plies extending inboardly to said root of said hybrid composite flexbeam.

8. The hybrid composite flexbeam of claim 5 further comprising an outboard transition region intermediate said pitch region and said second inboard tapered region, said outboard transition region being formed from unidirectional fiberglass plies to define upper and lower, left and right transition zones contiguous with said upper and lower, left and right side zones and said upper and lower internal zones, respectively, said upper and lower, left and right transition zones having edges having a configuration complementary to said parabolic fillet edges of said upper and lower external zones wherein said edges of said upper and lower, left and right transition zones butt against said parabolic fillet edges of said upper and lower external zones, respectively.

9. The hybrid composite flexbeam of claim 4 wherein said upper and lower internal zones have edges having a parabolic fillet configuration, and further wherein said upper and lower, left and right side zones have edges having a configuration complementary to said parabolic fillet configuration of said upper and lower internal zones wherein said edges of said upper and lower, left and right side zones butt against said parabolic fillet edges of said upper and lower internal zones, respectively.

10. The hybrid composite flexbeam of claim 4 wherein said interleaved plurality of unidirectional fiberglass and graphite plies forming said upper and lower internal zones are interleaved in an alternating arrangement of unidirectional fiberglass and graphite plies.

11. The hybrid composite flexbeam of claim 3 wherein said internally interleaved unidirectional fiberglass and graphite plies forming the second inboard tapered region comprise:

left and right spanwise side strips of unidirectional fiberglass; and central spanwise strips of unidirectional fiberglass and unidirectional graphite;

said left and right spanwise side strips butting against said corresponding central spanwise strips.

12. The hybrid composite flexbeam of claim 11 wherein said central spanwise strips of unidirectional fiberglass and unidirectional graphite are interleaved in an alternating arrangement of unidirectional fiberglass and unidirectional graphite.

13. The hybrid composite flexbeam of claim 3 wherein said first inboard tapered region includes first, second, and third transition segments wherein fiberglass cross plies of said plurality of internally interleaved fiberglass cross plies are uniformly internally interleaved in said first transition segment, fiberglass and graphite cross plies of said plurality of internally interleaved fiberglass and graphite cross plies are uniformly internally interleaved in said second transition segment, and first and second sets of graphite cross plies of said plurality of internally interleaved graphite cross plies are uniformly internally interleaved in distinct portions of said third transition segment.

14. The hybrid composite flexbeam of claim 13 wherein:
ply endings of said fiberglass cross plies uniformly internally interleaved in said first transition segment form a distributed ply drop-off arrangement therein;
ply endings of said fiberglass and graphite cross plies uniformly internally interleaved in said second transition segment form a distributed ply drop-off arrangement therein; and
ply endings of said first and second sets of said graphite cross plies uniformly interleaved in said distinct portions of said third transition segment form first and second distributed ply drop-off arrangements therein, respectively.

15. The hybrid composite flexbeam of claim 3 wherein said outboard tapered region includes fourth, fifth, sixth, and seventh transition segments wherein fiberglass cross plies of said plurality of internally interleaved fiberglass cross plies are uniformly internally interleaved in said fourth transition segment, fiberglass and graphite cross plies of said plurality of internally interleaved fiberglass and graphite cross plies are uniformly internally interleaved in said fifth transition segment, graphite cross plies of said plurality of internally interleaved graphite cross plies are uniformly internally interleaved in said six transition segment, and said plurality of internally interleaved unidirectional fiberglass plies are uniformly internally interleaved in said fifth transition segment.

16. The hybrid composite flexbeam of claim 3 wherein said hub attachment region comprises a substantially 50/50 admixture of unidirectional plies and cross plies of fiberglass and graphite.

17. The hybrid composite flexbeam of claim 16 wherein:
ply endings of said fiberglass cross plies uniformly internally interleaved in said fourth transition segment form a distributed ply drop-off arrangement therein;
ply endings of said fiberglass and graphite cross plies uniformly internally interleaved in said fifth transition segment form a distributed ply drop-off arrangement therein;
ply endings of said graphite cross plies uniformly internally interleaved in said sixth transition segment form a distributed ply drop-off arrangement therein; and
ply endings of said plurality of unidirectional fiberglass plies internally interleaved in said seventh transition segment form a distributed ply drop-off arrangement therein.

18. The hybrid composite flexbeam of claim 3 wherein said torque tube, main rotor blade attachment region comprises a substantially 50/50 admixture of unidirectional plies and cross plies of fiberglass and graphite.

19. The hybrid composite flexbeam of claim 3 wherein ply endings of said plurality of internally interleaved unidirectional fiberglass and graphite plies of varying lengths of said second inboard tapered region form a distributed ply drop-off arrangement therein.

20. The hybrid composite flexbeam of claim 3 wherein ply endings of said plurality of internally interleaved fiberglass and graphite cross plies of varying lengths of said first inboard tapered region form first, second, third, and fourth distributed ply drop-off arrangements therein.

21. The hybrid composite flexbeam of claim 3 wherein ply endings said internally interleaved plurality of fiberglass and graphite cross plies and said internally interleaved plurality of unidirectional fiberglass plies of varying length of said outboard tapered region form first, second, third, and fourth distributed ply drop-off arrangements therein.

22. The hybrid composite flexbeam of claim 1 further comprising:
a plurality of edge caps having a U-Shaped configuration disposed in combination the leading and trailing edges of said hybrid composite flexbeam, respectively, said plurality of edge caps including
a first edge cap disposed in combination with the leading edge of said hybrid composite flexbeam from the inboard limit of said pitch region into said first inboard tapered region;
a second edge cap disposed in combination with the trailing edge of said hybrid composite flexbeam from the inboard limit of said pitch region into said first inboard tapered region;
a third edge cap disposed in combination with the leading edge of said hybrid composite flexbeam from the outboard limit of said pitch region into said outboard tapered region; and
a fourth edge cap disposed in combination with the trailing edge of said hybrid composite flexbeam from the outboard limit of said pitch region into said outboard tapered region.

23. The hybrid composite flexbeam of claim 22 wherein said plurality of edge caps are formed from fiberglass.

24. The hybrid composite flexbeam of claim 23 wherein said fiberglass edge caps have fiber orientations of ±45°.

* * * * *